United States Patent
Trivelpiece et al.

(10) Patent No.: US 12,548,419 B2
(45) Date of Patent: *Feb. 10, 2026

(54) VALIDATING RADIO FREQUENCY IDENTIFICATION (RFID) ALARM EVENT TAGS

(71) Applicant: Sensormatic Electronics, LLC, Boca Raton, FL (US)

(72) Inventors: Steve E. Trivelpiece, Rancho Santa Margarita, CA (US); David Torrecilla Puertas, Madrid (ES); Eric Riggert, Trabuco Canyon, CA (US); Adam S. Bergman, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 123 days.

This patent is subject to a terminal disclaimer.

(21) Appl. No.: 18/313,773

(22) Filed: May 8, 2023

(65) Prior Publication Data

US 2023/0274626 A1  Aug. 31, 2023

Related U.S. Application Data

(63) Continuation of application No. 17/036,635, filed on Sep. 29, 2020, now Pat. No. 11,676,462.
(Continued)

(51) Int. Cl.
| | |
|---|---|
| G08B 13/14 | (2006.01) |
| G08B 13/24 | (2006.01) |
| H04B 17/318 | (2015.01) |

(52) U.S. Cl.
CPC ..... *G08B 13/1427* (2013.01); *G08B 13/2417* (2013.01); *G08B 13/2471* (2013.01); *H04B 17/318* (2015.01)

(58) Field of Classification Search
None
See application file for complete search history.

(56) References Cited

U.S. PATENT DOCUMENTS 9,183,717 B1   11/2015  Diorio et al.
9,959,494 B1 *  5/2018  Shyamkumar ....... G06Q 10/087
(Continued)

OTHER PUBLICATIONS

International Search Report and Written Opinion in PCT/US2020/053513, mailed Jan. 12, 2021, 11 pages.

*Primary Examiner* — Thomas S Mccormack
(74) *Attorney, Agent, or Firm* — ArentFox Schiff LLP

(57) ABSTRACT

An RFID portal of an EAS system first interrogates a first zone extending into a controlled area beyond a threshold distance from an interrogating antenna of the portal. The portal defines an exit from the controlled area, the threshold distance being less than a width of the exit. The portal first detects, in response to the first interrogating, a first response of a particular RFID tag. The portal second interrogate, subsequent to the first detecting, in a second zone extending into the controlled area at least to the threshold distance. The portal second detects, in response to the second interrogating, at least one second response of the particular RFID tag indicating a received signal strength of the second interrogating at the particular RFID tag corresponding to a distance from an interrogating antenna of the portal less than the threshold distance. The EAS system alarms in response to the second detecting.

20 Claims, 9 Drawing Sheets

Related U.S. Application Data

(60) Provisional application No. 62/908,536, filed on Sep. 30, 2019.

(56) References Cited

U.S. PATENT DOCUMENTS

| | | | |
|---|---|---|---|
| 2007/0152823 A1* | 7/2007 | Hirahara | G08B 13/2462 340/572.1 |
| 2012/0044074 A1* | 2/2012 | Mulla | G08B 13/2448 340/572.1 |
| 2015/0194030 A1* | 7/2015 | Davidson | G08B 13/2468 340/572.7 |
| 2017/0146636 A1* | 5/2017 | Alicot | G08B 13/2462 |
| 2018/0365542 A1* | 12/2018 | Kantor | G06F 16/9017 |

* cited by examiner

VALIDATING RADIO FREQUENCY IDENTIFICATION (RFID) ALARM EVENT TAGS

CROSS-REFERENCE TO RELATED APPLICATIONS

This application is a continuation of U.S. patent application Ser. No. 17/036,635, entitled "Validating Radio Frequency (RFID) Alarm Event Tags," filed Sep. 29, 2020; which claims the benefit of U.S. Provisional Patent Application No. 62/908,536, entitled "System and Method Improved Theft Determination for RFID Exit Portal Alarms with Customer Intercept Directive," filed Sep. 30, 2019, which is expressly incorporated by reference herein in its entirety.

BACKGROUND

Technical Field

The present disclosure relates generally to Electronic Article Surveillance (EAS). Examples related to EAS using a Radio Frequency Identification (RFID) tag.

INTRODUCTION

Electronic article surveillance (EAS) systems are used to control inventory and to prevent or deter theft or unauthorized removal of articles from a controlled area. Such systems establish an electromagnetic field or "interrogation zone" that defines a surveillance zone (for example, entrances and/or exits in retail stores) encompassing the controlled area. The articles to be protected are tagged with an EAS security tag. Tags are designed to interact with the field in the interrogation zone. e.g., established by an EAS portal. The EAS portal includes one or more EAS readers (e.g., transmitter/receiver, antennas), and an EAS detection module/controller. The presence of a tag in the interrogation zone is detected by the system and appropriate action is taken. In most cases, the appropriate action includes the activation of an alarm.

In the retail industry, it is common to "source tag" articles with RFID tags, either at the time of packaging/manufacture, or at some other point in the in the supply chain. At the same time, EAS technology and devices have proven critical to the reduction of theft and so called "shrinkage." Since many articles arrive at the retailer with RFID tags, it is desirable that RFID tag be used also to provide EAS functionality in addition to their intended function of providing capabilities such as inventory control, shelf reading, non-line of sight reading, etc.

In some implementations, an RFID tag can be used to simulate EAS functionality by sending special codes when a reader interrogates the RFID tag. This arrangement advantageously eliminates the need for a separate EAS component, such an acousto-magnetic (AM) component, within the tag, or a separate EAS tag. Various schemes can be used to enable the use of RFID tags to simulate EAS functionality. In some such systems, the RFID tag indicates in some way that the item to which the tag is attached has been purchased at point of sale (POS). If the RFID tag is a detachable tag, the RFID tag can be simply detached at the point of sale. In such a system, the RFID readers at the exit would trigger an alarm if any tags are detected. In some such systems, data is written to the RFID chip at the POS to confirm the item was purchased. One common method is encoding a bit-flip at the POS, with the changed bit indicating that the item is authorized for removal. Other systems may read a unique ID from the tag, and store the unique ID in the enterprise system when the tagged item is purchased, so that the purchase can be verified by RFID readers as the tag exits the premises. If the purchase of the item cannot be verified based on tag data when the tag passes out of the store, an alarm can be triggered.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

Examples of the technology disclosed herein include methods, systems, and apparatuses of electronic article surveillance (EAS). In some examples, an RFID portal of an EAS system first interrogates in a first zone extending into a controlled area beyond a threshold distance from an interrogating antenna of the RFID portal. The RFID portal defines an exit from the controlled area, the threshold distance being less than a width of the exit. The RFID portal first detects, in response to the first interrogating, a first response of a particular RFID tag. The RFID portal second interrogate, subsequent to the first detecting, in a second zone extending into the controlled area at least to the threshold distance. The RFID portal second detects, in response to the second interrogating, at least one second response of the particular RFID tag indicating a received signal strength of the second interrogating at the particular RFID tag corresponding to a distance from an interrogating antenna of the RFID portal less than the threshold distance. The EAS system alarms in response to the second detecting.

In some examples, first detecting includes determining, by the EAS system, that the particular tag is moving in a direction exiting the controlled area. In such examples, second interrogating is in response to the first detecting. In some examples, alarming includes displaying information relating to at least one of: the particular RFID tag, and an article associated with the particular RFID tag. In some such examples, displaying includes displaying on one of the RFID portal or a mobile communication device.

In some examples, indicating a received signal strength comprises responding with a received signal strength indicator (RSSI). In some examples, the threshold distance is no greater than one foot, in others the threshold distance is no greater than two feet. In some examples, the EAS system receives, prior to the first interrogating, selection of the threshold distance. In some examples, the first interrogating is multi-session interrogating during which the particular RFID tag would not be guaranteed to respond to a subsequent interrogation.

In such examples, the second interrogating includes interrogating in which all RFID tags within the threshold distance are allowed to respond. In some examples, the second detecting includes at least a predetermined threshold number, greater than one, of second responses. In some examples, the alarming further requires an indication of at least one person in the exit concurrent with the first detecting.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
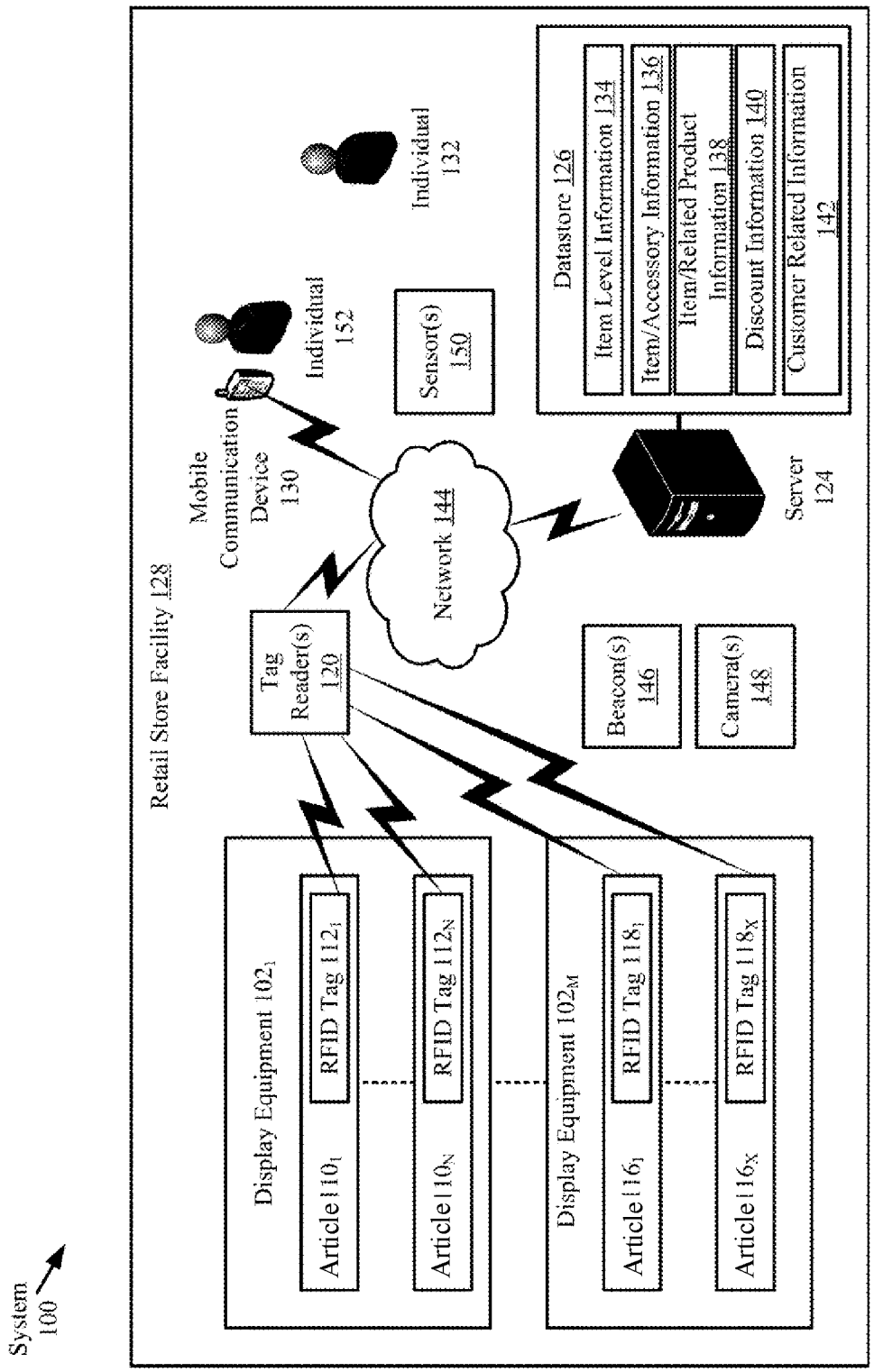
FIG. 1 is an illustration of an illustrative architecture for a system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is indicated by the appended claims rather than by this detailed description. All changes that come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages, and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

As used in this document, the singular form "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Currently, using RFID as an EAS exit solution is limited by stray or reflected alarms when transmission powers are increased. People walking through the EAS portal may trigger alarms even if they are not removing articles from the premises without authorization. Alarms can be caused by stationary RFID tags located some distance from the exit. Further, such an approach limits the ability for the retailer to place articles too close to an EAS portal due to false alarms. The large read ranges of the RFID technology coupled with RF reflections makes it very difficult to control the RFID system's detection area at the exit from the controlled area.

In real-world environments, with changing RF reflections may be subject to constant change to store fixtures, furniture, support columns, doors, customers in motion, shopping carts etc. These types of systems sometimes have a hard time properly discriminating between actual tags that are read outside (or detected going outside), and tags on items properly inside the store that are falsely read outside due to RF reflections, multipath/backscattering, or missed inventory attempts due to temporary interferers.

As RFID transmission levels are increased in a RFID-as-EAS system, the number of false alarms caused by stray or reflected may also increase, which can compromise the accuracy and effectiveness of the system. With increased transmission power levels, people walking through the EAS portal may appear to be triggering alarms, even if they are not trying to remove articles from the premises without authorization. These false alarms can be triggered by stationary RFID tags located some distance from the exit, not the person exiting the store.

Further, there are situations in which human judgment is useful to determine if an RFID-as-EAS alarm is indicative of theft, or if the alarms is simply a false alarm. Typically, a retail store will station a human guard or monitor at the point of exit to interact with customers exiting the store, and this the human guard or monitor is tasked with providing the last line of defense against theft. If there is an alarm caused by detection of an unauthorized RFID tag, the guard must quickly determine what articles may have been stolen, and by which people. This can be difficult in crowded, fast-moving situations.

Typically, the guard/monitor takes into account that there may be a case of a false alarm as can occur when the detected tag is on an article inside the store and there is no actual theft. In this case, the retail store would not want a guard to detain unfairly a customer who has properly purchased their article in an attempt to determine if they have stolen the article.

Another challenge for the guard or monitor is when multiple people are near the exit gate. If more than one customer is traveling through or near the exit gate and an alarm is triggered, the guard or monitor typically attempts to determine, quickly and accurately, which customer/person could be stealing an article. In order to help the guard, make this decision it would be useful for the EAS system to supply more information than just sounding the alarm, preferably communicating to the guard or monitor in close to real time.

Examples of the technology disclosed herein can provide for the near real-time collection/display of additional data that is related to the detection of an unauthorized RFID tag moving through an RFID exit portal in near real-time, where such additional data is can be used to determine a probability that the detection of the tag indicates theft. In another aspect of the technology disclosed herein, solutions are disclosed wherein the RFID detection system is adapted to alarm based on logic that appears (to the guard) similar to the logic used in AM EAS systems, thus making it easier for a guard or monitor stationed at the scene to determine if a theft is in progress. In another aspect of the invention, examples of the technology disclosed herein provide a directive to the guard or human monitor to indicate that a person should be intercepted and questioned before they reach the exit.

These and other features of the present disclosure are discussed in detail below with regard to FIGS. 1-9.

Referring now to FIG. 1, there is provided a schematic illustration of an illustrative system 100 that is useful for understanding the present solution. The present solution is described herein in relation to a retail store environment. The present solution is not limited in this regard, and can be used in other environments. For example, the present solution can be used in distribution centers, factories and other commercial environments. Notably, the present solution can be employed in any environment in which objects and/or items/articles need to be located and/or tracked.

The system 100 is generally configured to allow (a) improved inventory counts and surveillance of objects and/or items/articles located within a facility, and (b) improved customer experiences. As shown in FIG. 1, system 100 comprises a Retail Store Facility ("RSF") 128 in which display equipment $102_1$-$102_M$ is disposed. The display equipment is provided for displaying objects (or items/articles) $110_1$-$110_N$, $116_1$-$116_X$ to customers of the retail store. The display equipment can include, but is not limited to, shelves, article display cabinets, promotional displays, fixtures, and/or equipment se-curing areas of the RSF 128. The RSF 128 can also include emergency equipment (not shown), checkout counters, and other equipment and fixtures typical for the facility type. Emergency equipment, checkout counters, video cameras, people counters, and conventional EAS systems are well known in the art, and therefore may not be described at a sufficient level of detail herein for understanding of the claimed invention.

At least one tag reader 120 is provided to assist in counting and tracking locations the articles $110_1$-$110_N$, $116_1$-$116_X$ within the RSF 128. The tag reader 120 comprises an RFID reader configured to read RFID tags. RFID readers are well known in the art, and therefore will be described at a sufficient level of detail herein for understanding of the claimed invention.

RFID tags $112_1$-$112_N$, $118_1$-$118_X$ (hereinafter "112," generally) are respectively attached or coupled to the articles $110_1$-$110_N$, $116_1$-$116_X$ (hereinafter "110," generally). This coupling can be achieved via an adhesive (e.g., glue, tape, or sticker), a mechanical coupler (e.g., straps, clamps, snaps, etc.), a weld, chemical bond, or other means. The RFID tags 112 can alternatively or additionally comprise dual-technology tags that have both EAS and RFID capabilities as described herein.

Notably, the tag reader 120 is strategically placed at a known location within the RSF 128, for example, at an exit/entrance. By correlating the tag reader's RFID tag reads and the tag reader's known location within the RSF 128 it is possible to determine the general location of articles 110 within the RSF 128. The tag reader's known coverage area also facilitates article 110 location determinations. Accordingly, RFID tag read information and tag reader 120 location information is stored in a datastore 126. This information can be stored in the datastore 126 using a server 124 and network 144 (e.g., an Intranet and/or Internet).

System 100 also comprises a Mobile Communication Device ("MCD") 130. MCD 130 includes, but is not limited to, a cell phone, a smart phone, a table computer, a personal digital assistant, and/or a wearable device (e.g., a smart watch). Each of the listed devices is well known in the art, and therefore will not be described herein. In accordance with some examples, the MCD 130 has a software application installed thereon that is operative to: facilitate the provision of various information 134-142 to the individual 152; facilitate a purchase transaction; and/or facilitate the detachment of the RFID tags 112 from the articles 110; and/or facilitate the detachment of an anchored chain or cable from the articles 110.

The MCD 130 is generally configured to provide a visual and/or auditory output of item/article level information 134, accessory information 136, related product information 138, discount information 140, and/or customer related information 142. The item level information includes, but is not limited to, an item description, item nutritional information, a promotional message, an item regular price, an item sale price, a currency symbol, and/or a source of the item.

An accessory includes, but is not limited to, a useful auxiliary item that can be attached to or removed from an item/article (e.g., a drill bit or battery of a drill). The accessory information includes, but is not limited to, an accessory description, accessory nutritional information, a promotional message, an accessory regular price, an accessory sale price, a currency symbol, a source of the accessory, and/or an accessory location in the facility.

A related product includes, but is not limited to, a product/article that can be used in conjunction with or as an alternative to another product/article (e.g., diaper rash cream which can be used when changing a diaper, or a first diaper can be used as an alternative to another diaper). The related product information includes, but is not limited to, a related product description, related product nutritional information, a promotional message, a related product regular price, a related product sale price, a currency symbol, a source of the related product, and/or a related product location in the facility.

The discount information can include, but is not limited to, a discount price for an article/product based on a loyalty level or other criteria. The customer related information includes, but is not limited to, customer account numbers, customer identifiers, usernames, passwords, payment information, loyalty levels, historical purchase information, and/or activity trends.

The item level information, accessory information, related product information and/or discount information can be output in a format selected from a plurality of formats based on a geographic location of the item/article 110, a location of the MCD, a date, and/or an item pricing status (i.e., whether the item/article is on sale). In a display context, the format is defined by a font parameter, a color parameter, a brightness parameter, and/or a display blinking parameter. In an auditory context, the format is defined by a volume parameter, a voice tone parameter, and/or a male/female voice selected parameter.

The MCD 130 can also be configured to read barcodes and/or RFID tags 112. Information obtained from the barcode and/or RFID tag reads may be communicated from the MCD 130 to the server 124 via network 144. Similarly, the stored information 134-142 is provided from the server 124 to the MCD 130 via network 144. The network 144 includes an Intranet and/or the Internet.

Server 124 can be local to the facility 128 as shown in FIG. 1 or remote from the facility 128. Server 124 will be described in more detail below in relation to FIG. 4. Still, it should be understood that server 124 is configured to: write data to and read data from datastore 126, RFID tags 112, and/or MCD 130; perform language and currency conversion operations using item level information and/or accessory information obtained from the datastore, RFID tags 112, and/or MCD; perform data analytics based on inventory information, tag read information, MCD tracking information, and/or information 134-142; perform image processing using images captured by camera(s) 148; and/or determine locations of RFID tags 112 and/or MCDs in the RSF 128 using beacon(s) 146, tag reader 120 or other devices having known locations and/or antenna patterns.

In some examples, one or more beacons 146 transmitting an RF signal (second RF signal that is non-RFID) other than the RFID interrogation signal are placed to cover a zone of interest also covered by a tag reader 120 placed to cover an RFID interrogation zone, e.g., at a portal of the retail facility 128. The system 100 can detect and derive any number of relevant indicators based on second RF signal. The tag 112 response to the second RF signal is analyzed and compared to data collected by the RFID signal response that occurred concurrently with tag 112 passage through the portal.

The server 124 facilitates updates to the information 134-142 output from the MCD 130. Such information updating can be performed periodically, in response to instructions received from an associate (e.g., a retail store employee 132), in response to a detected change in the item level, accessory and/or related product information, in response to a detection that an individual is in proximity to an RFID tag 112, and/or in response to any motion or movement of the RFID tag 112. For example, if a certain product/article is placed on sale, then the sale price for that product/article is transmitted to MCD 130 via network 144 and/or RFID tag 112. The sale price is then output from the MCD 130. The present solution is not limited to the particulars of this example.

Although a single MCD 130 and/or a single server 124 are shown in FIG. 1, the present solution is not limited in this regard. It is contemplated that more than one computing device can be implemented. In addition, the present solution is not limited to the illustrative system architecture described in relation to FIG. 1.

During operation of system 100, the content displayed on the display screen of the MCD 130 is dynamically controlled based upon various tag 112 or item 110 related information and/or customer related information (e.g., mobile device identifier, mobile device 130 location in RSF 128, and/or customer loyalty level). Tag 112 or item level information includes, but is not limited to, first information indicating that an RFID tag 112 is in motion or that an article 110 is being handled by an individual 152, second information indicating a current location of the RFID tag 112 and/or the MCD 130, third information indicating an accessory or related product of the article 110 to which the moving RFID tag 112 is coupled, and/or fourth information indicating the relative locations of the accessory and the moving RFID tag 112 and/or the relative locations of the related article 110 and the moving RFID tag 112. The first, second and fourth information can be derived based on sensor data generated by sensors local to the RFID tag 112. Accordingly, the RFID tags 112 include one or more sensors to detect their current locations, detect any individual in proximity thereto, and/or detect any motion or movement thereof. The sensors include, but are not limited to, an Inertial Measurement Unit ("IMU"), a vibration sensor, a light sensor, an accelerometer, a gyroscope, a proximity sensor, a microphone, and/or a beacon communication device. The third information can be stored local to the RFID tags 112 or in a remote datastore 126 as information 136, 138.

In some scenarios, the MCD 130 facilitates the server's 124 (a) detection of when the individual 152 enters the RSF 128, (b) tracking of the individual's movement through the RSF, (c) detection of when the individual is in proximity to an article 110 to which an RFID tag 112 is coupled, (d) determination that an RFID tag 112 is being handled or moved by the individual 152 based on a time stamped pattern of MCD movement and a timestamped pattern of RFID tag 112 movement, and/or (e) determination of an association of moving RFID tags 112 and the individual 152.

When a detection is made that an RFID tag 112 is being moved, the server 124 can, in some scenarios, obtain customer related information (such as a loyalty level) 142 associated with the individual. This information can be obtained from the individual's MCD 130 and/or the datastore 126. The customer related information 142 is then used to retrieve discount information 140 for the article 110 to which the RFID tag 112 is coupled. The retrieved discount information is then communicated from the server 124 to the individual's MCD 130. The individual's MCD 130 can output the discount information in a visual format and/or an auditory format. Other information may also be communicated from the server 124 to the individual's MCD 130. The other information includes, but is not limited to, item level information, accessory information, and/or related product information.

In those or other scenarios, a sensor embedded in the RFID tag 112 detects when an individual is handling the article 110 to which the RFID tag 112 is coupled. When such a detection is made, the RFID tag 112 retrieves the object's unique identifier from its local memory, and wirelessly communicates the same to the tag reader 120. The tag reader 120 then passes the information to the server 124. The server 124 uses the object's unique identifier and the item/accessory relationship information (e.g., table) 136 to determine if there are any accessories associated therewith. If no accessories exist for the article 110, the server 124 uses the item level information 134 to determine one or more characteristics of the article 110. For example, the article 110 includes a product of a specific brand. The server 124 then uses the item/related product information (e.g., table) 138 to identify: other products of the same type with the same characteristics; and/or other products that are typically used in conjunction with the object. Related product information for the identified related products is then retrieved and provided to the MCD 130. The MCD 130 can output the related product information in a visual format and/or an auditory format. The individual 152 can perform user-software interactions with the MCD 130 to obtain further information obtain the related product of interest. The present solution is not limited to the particulars of this scenario.

Figure 2:
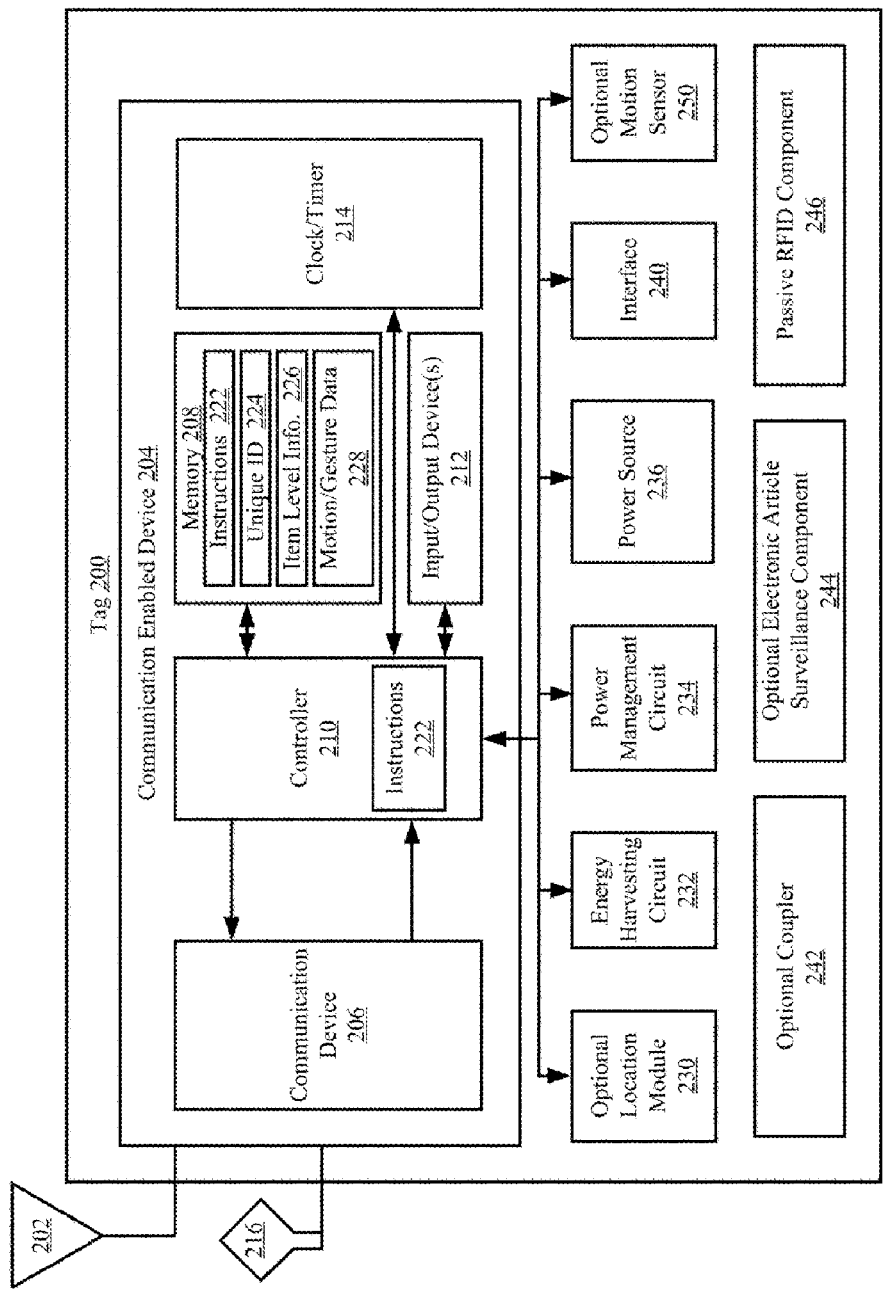
FIG. 2 is an illustration of an illustrative architecture for a tag.

Referring now to FIG. 2, there is an illustration of an illustrative architecture for a tag 200. RFID tags $112_1$-$112_N$, $118_1$-$118_X$ are the same as or similar to tag 200. As such, the discussion of tag 200 is sufficient for understanding the RFID tags $112_1$-$112_N$, $118_1$-$118_X$ of FIG. 1. Tag 200 is generally configured to perform operations to (a) minimize power usage so as to extend a power source's life (e.g., a battery or a capacitor), (b) minimize collisions with other tags so that the tag of interest can be seen at given times, (c) optimize useful information within an inventory system (e.g., communicate useful change information to a tag reader), and/or (d) optimize local feature functions.

The tag 200 can include more or less components than that shown in FIG. 2. However, the components shown are sufficient to disclose an illustrative embodiment implementing the present solution. Some or all of the components of the tag 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative tag 200 configured to facilitate improved inventory management/surveillance and customer experience. In this regard, the tag 200 is configured for allowing data to be exchanged with an external device (e.g., tag reader 120 of FIG. 1, a beacon 146 of FIG. 1, a Mobile Communication Device ("MCD") 130 of FIG. 1, and/or server 124 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies are employed: Radio Frequency ("RF") communication technology; Bluetooth technology (including Bluetooth Low Energy (LE)); WiFi technology; beacon technology; and/or LiFi technology. Each of the listed wireless communication technologies is well known in the art, and therefore will not be described in detail herein. Any known or to be known wireless communication technology or other wireless communication technology can be used herein without limitation.

The components 206-214 shown in FIG. 2 may be collectively referred to herein as a communication enabled device 204, and include a memory 208 and a clock/timer 214. Memory 208 may be a volatile memory and/or a non-volatile memory. For example, the memory 208 can include, but is not limited to, Random Access Memory ("RAM"), Dynamic RAM ("DRAM"), Static RAM ("SRAM"), Read Only Memory ("ROM"), and flash memory. The memory 208 may also comprise unsecure memory and/or secure memory.

In some scenarios, the communication enabled device 204 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 208. Notably, the communication protocols can be downloaded to the device at any given time. The initial/default role (being an RFID, WiFi, LiFi, etc. tag) can be assigned at the deployment thereof. If the user desires to use another protocol later, the user can remotely change the communication protocol of the deployed tag 200. The update of the firmware, in case of issues, can also be performed remotely.

As shown in FIG. 2, the communication enabled device 204 comprises at least one antenna 202, 216 for allowing data to be exchanged with the external device via a wireless communication technology (e.g., an RFID technology, an NFC technology, a SRC technology, and/or a beacon technology). The antenna 202, 216 is configured to receive signals from the external device and/or transmit signals generated by the communication enabled device 204. The antenna 202, 216 can comprise a near-field or far-field antenna. The antennas include, but are not limited to, a chip antenna or a loop antenna.

The communication enabled device 204 also comprises a communication device (e.g., a transceiver or transmitter) 206. Communication devices (e.g., transceivers or transmitters) are well known in the art, and therefore will not be described herein. However, it should be understood that the communication device 206 generates and transmits signals (e.g., RF carrier signals) to external devices, as well as receives signals (e.g., RF signals) transmitted from external devices. In this way, the communication enabled device 204 facilitates the registration, identification, and location and/or tracking of an item (e.g., article 110 or 112 of FIG. 1) to which the tag 200 is coupled.

The communication enabled device 204 is configured so that it: communicates (transmits and receives) in accordance with a time slot communication scheme; and selectively enables/disables/bypasses the communication device (e.g., transceiver) or at least one communications operation based on output of a motion sensor 250. In some scenarios, the communication enabled device 204 selects: one or more time slots from a plurality of time slots based on the tag's unique identifier 224 (e.g., an Electronic Product Code ("EPC")); and/or determines a Window Of Time ("WOT") during which the communication device (e.g., transceiver) 206 is to be turned on or at least one communications operation is be enabled subsequent to when motion is detected by the motion sensor 250. The WOT can be determined based on environmental conditions (e.g., humidity, temperature, time of day, relative distance to a location device (e.g., beacon or location tag), etc.) and/or system conditions (e.g., amount of traffic, interference occurrences, etc.). In this regard, the tag 200 can include additional sensors not shown in FIG. 2.

The communication enabled device 204 also facilitates the automatic and dynamic modification of item level information 226 that is being or is to be output from the tag 200 in response to certain trigger events. The trigger events can include, but are not limited to, the tag's arrival at a particular facility (e.g., RSF 128 of FIG. 1), the tag's arrival in a particular country or geographic region, a date occurrence, a time occurrence, a price change, and/or the reception of user instructions.

Item level information 226 and a unique identifier ("ID") 224 for the tag 200 can be stored in memory 208 of the communication enabled device 204 and/or communicated to other external devices (e.g., tag reader 120 of FIG. 1 or tag reader 300 of FIG. 3 described below, beacon 146 of FIG. 1, MCD 130 of FIG. 1, and/or server 124 of FIG. 1) via communication device (e.g., transceiver) 206 and/or interface 240 (e.g., an Internet Protocol or cellular network interface). For example, the communication enabled device 204 can communicate information specifying a timestamp, a unique identifier for an item/article 110, item description, item price, a currency symbol and/or location information to an external device. The external device (e.g., server 124, 400 or MCD 130) can then store the information in a database (e.g., database 126 of FIG. 1) and/or use the information for various purposes.

The communication enabled device 204 also comprises a controller 210 (e.g., a CPU) and in-put/output devices 212. The controller 210 can execute instructions 222 implementing methods for facilitating inventory counts and management. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 can also reside, completely or at least partially, with-in the controller 210 during execution thereof by the tag 200. The memory 208 and the controller 210 also can constitute machine-readable media. The term "machine-readable media," as used here, refers to a single medium or multiple media (e.g., a centralized or distributed database, and/or associated caches and servers) that store the one or more sets of instructions 222. The term "machine-readable media," as used here, also refers to any medium that is capable of storing, encoding, or carrying a set of instructions 222 for execution by the tag 200 and that cause the tag 200 to perform any one or more of the methodologies of the present disclosure.

The input/output devices 212 can include, but are not limited to, a display (e.g., an E Ink display, an LCD display, and/or an active matrix display), a speaker, a keypad, and/or light emitting diodes. The display is used to present item level information in a textual format and/or graphical format. Similarly, the speaker may be used to output item level information in an auditory format. The speaker and/or light emitting diodes may be used to output alerts for drawing a person's attention to the tag 200 (e.g., when motion thereof has been detected) and/or for notifying the person of a particular pricing status (e.g., on sale status) of the item/article 110 to which the tag is coupled.

The clock/timer 214 is configured to determine a date, a time, and/or an expiration of a pre-defined period of time. Technique for determining these listed items are well known in the art, and therefore will not be described herein. Any known or to be known technique for determining these listed items can be used herein without limitation.

The tag 200 also comprises an optional location module 230. The location module 230 is generally configured to determine the geographic location of the tag at any given time. For example, in some scenarios, the location module 230 employs Global Positioning System ("GPS") technology and/or Internet based local time acquisition technology. The present solution is not limited to the particulars of this example. Any known or to be known technique for determining a geographic location can be used herein without limitation including relative positioning within a facility or structure.

The optional coupler 242 is provided to couple the tag 200 securely or removably to an item (e.g., object 110 or 112 of FIG. 1). The coupler 242 includes, but is not limited to, a mechanical coupling means (e.g., a strap, clip, clamp, snap) and/or adhesive (e.g., glue or sticker). The coupler 242 is optional since the coupling can be achieved via a weld and/or chemical bond.

The tag 200 can also include a power source 236, an optional EAS component 244, and/or a passive/active/semi-passive RFID component 246. Each of the listed components 236, 244, 246 is well known in the art, and therefore will not be described herein. Any known or to be known battery, EAS component and/or RFID component can be used herein without limitation. The power source 236 can include, but is not limited to, a rechargeable battery and/or a capacitor.

As shown in FIG. 2, the tag 200 further comprises an energy harvesting circuit 232 and a power management circuit 234 for ensuring continuous operation of the tag 200 without the need to change the rechargeable power source (e.g., a battery). In some scenarios, the energy harvesting circuit 232 is configured to harvest energy from one or more sources (e.g., heat, light, vibration, magnetic field, and/or RF energy) and to generate a relatively low amount of output power from the harvested energy. By employing multiple sources for harvesting, the device 200 can continue to charge despite the depletion of a source of energy. Energy harvesting circuits are well known in the art, and therefore will not be described herein. Any known or to be known energy harvesting circuit 232 can be used herein without limitation.

As noted above, the tag 200 may also include a motion sensor 250. Motion sensors are well known in the art, and therefore will not be described herein. Any known or to be known motion sensor can be used herein without limitation. For example, the motion sensor 250 includes, but is not limited to, a vibration sensor, an accelerometer, a gyroscope, a linear motion sensor, a Passive Infrared ("PIR") sensor, a tilt sensor, and/or a rotation sensor.

The motion sensor 250 is communicatively coupled to the controller 210 such that it can notify the controller 210 when tag motion is detected. The motion sensor 250 also communicates sensor data to the controller 210. The sensor data is processed by the controller 210 to determine whether the motion is of a type for triggering enablement of the communication device (e.g., transceiver) 206 or at least one communications operation. For example, the sensor data can be compared to stored motion/gesture data 228 to determine if a match exists there-between. More specifically, a motion/gesture pattern specified by the sensor data can be compared to a plurality of motion/gesture patterns specified by the stored motion/gesture data 228. The plurality of motion/gesture patterns can include, but are not limited to, a motion pattern for walking, a motion pattern for running, a motion pattern for vehicle transport, a motion pattern for vibration caused by equipment or machinery in proximity to the tag (e.g., an air conditioner or fan), a gesture for requesting assistance, a gesture for obtaining additional product information, and/or a gesture for product purchase. The type of movement (e.g., vibration or being carried) is then determined based on which stored motion/gesture data matches the sensor data. This feature allows the tag 200 to selectively enable the communication device (e.g., transceiver) or at least one communications operation only when the tag's location within a facility is actually being changed (e.g., and not when a fan is causing the tag to simply vibrate).

In some scenarios, the tag 200 can be also configured to enter a sleep state in which at least the motion sensor triggering of communication operations is disabled. This is desirable, for example, in scenarios when the tag 200 is being shipped or transported from a distributor to a customer. In those or other scenarios, the tag 200 can be further configured to enter the sleep state in response to its continuous detection of motion for a given period of time. The tag 200 transition from a sleep state in response to expiration of a defined time period, tag 200 reception of a control signal from an external device, and/or tag 200 detection of no motion for a period of time.

The power management circuit 234 is generally configured to control the supply of power to components of the tag 200. In the event all of the storage and harvesting resources deplete to a point where the tag 200 is about to enter a shutdown/brownout state, the power management circuit 234 can cause an alert to be sent from the tag 200 to a remote device (e.g., tag reader 120 or server 124 of FIG. 1). In response to the alert, the remote device can inform an associate (e.g., a store employee 132 of FIG. 1) so that (s)he can investigate why the tag 200 is not recharging and/or holding charge.

The power management circuit 234 is also capable of redirecting an energy source to the tag 200 electronics based on the energy source's status. For example, if harvested energy is sufficient to run the tag 200 functions, the power management circuit 234 confirms that all of the tag 200 storage sources are fully charged such that the tag 200 electronic components can be run directly from the harvested energy. This ensures that the tag 200 has stored energy in case harvesting source(s) disappear or lesser energy is harvested for reasons such as drop in RF, light or vibration power levels. If a sudden drop in any of the energy sources is detected, the power management circuit 234 can cause an alert condition to be sent from the tag 200 to the remote device (e.g., tag reader 120 or server 124 of FIG. 1). At this point, an investigation may be required as to what caused this alarm. Accordingly, the remote device can inform the associate (e.g., a store employee 132 of FIG. 1) so that (s)he can investigate the issue. It may be that other merchandise are obscuring the harvesting source or the tagged article 110 is being stolen.

The present solution is not limited to that shown in FIG. 2. The tag 200 can have any architecture provided that it can perform the functions and operations described herein. For example, all of the components shown in FIG. 2 can comprise a single device (e.g., an Integrated Circuit ("IC")). Alternatively, some of the components can comprise a first tag element (e.g., a Commercial Off The Shelf ("COTS") tag) while the remaining components comprise a second tag element communicatively coupled to the first tag element. The second tag element can provide auxiliary functions (e.g., motion sensing, etc.) to the first tag element. The second tag element may also control operational states of the first tag element. For example, the second tag element can selectively (a) enable and disable one or more features/operations of the first tag element (e.g., transceiver operations), (b) couple or decouple an antenna to and from the first tag element, (c) by-pass at least one communications device or operation, and/or (d) cause an operational state of the first tag element to be changed (e.g., cause transitioning the first tag element between a power save mode and non-power save mode). In some scenarios, the operational state change can be achieved by changing the binary value of at least one state bit (e.g., from 0 to 1, or vice versa) for causing certain communication control operations to be performed by the tag 200. Additionally or alternatively, a switch can be actuated for creating a closed or open circuit. The present solution is not limited in this regard.

Figure 3:
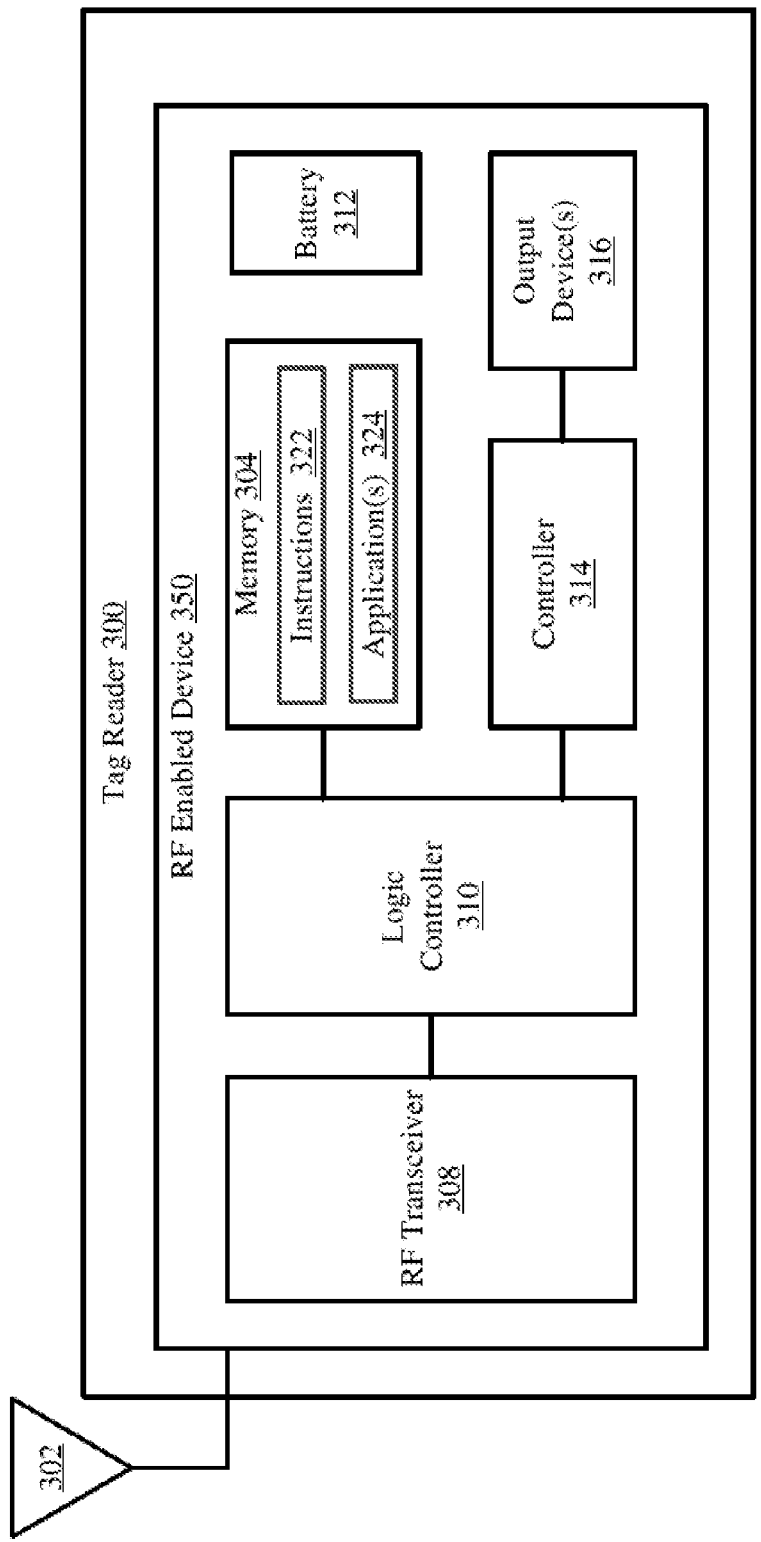
FIG. 3 is an illustration of an illustrative architecture for a tag reader.

Referring now to FIG. 3, there is provided a detailed block diagram of an exemplary architecture for a tag reader 300. Tag reader 120 of FIG. 1 is the same as or similar to tag reader 300. As such, the discussion of tag reader 300 is sufficient for understanding tag reader 120.

Tag reader 300 may include more or less components than that shown in FIG. 3. However, the components shown are sufficient to disclose an illustrative embodiment implementing the present solution. Some or all of the components of the tag reader 300 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 3 represents an illustration of a representative tag reader 300 configured to facilitate improved inventory counts and management within an RSF (e.g., RSF 128 of FIG. 1). In this regard, the tag reader 300 comprises an RF enabled device 350 for allowing data to be exchanged with an external device (e.g., RFID tags $112_1$-$112_N$, $118_1$-$118_X$ of FIG. 1) via RF technology. The components 304-316 shown in FIG. 3 may be collectively referred to herein as the RF enabled device 350, and may include a power source 312 (e.g., a battery) or be connected to an external power source (e.g., an AC mains).

The RF enabled device 350 comprises one or more antennas 302 for allowing data to be exchanged with the external device via RF technology (e.g., RFID technology or other RF based technology). The external device may comprise RFID tags $112_1$-$112_N$, $118_1$-$118_X$ of FIG. 1. In this case, the antenna 302 is configured to transmit RF carrier signals (e.g., interrogation signals) to the listed external devices, and/or transmit data response signals (e.g., authentication reply signals or an RFID response signal) generated by the RF enabled device 350. In this regard, the RF enabled device 350 comprises an RF transceiver 308. RF transceivers are well known in the art, and therefore will not be described herein. However, it should be understood that the RF transceiver 308 receives RF signals including information from the transmitting device, and forwards the same to a logic controller 310 for extracting the information therefrom.

The extracted information can be used to determine the presence, location, and/or type of movement of an RFID tag within a facility (e.g., RSF 128 of FIG. 1). Accordingly, the logic controller 310 can store the extracted information in memory 304, and execute algorithms using the extracted information. For example, the logic controller 310 can correlate tag reads with beacon reads to determine the location of the RFID tags within the facility. The logic controller 310 can also perform pattern recognition operations using sensor data received from RFID tags and comparison operations between recognized patterns and pre-stored patterns. The logic controller 310 can further select a time slot from a plurality of time slots based on a tag's unique identifier (e.g., an EPC), and communicate information specifying the selected time slot to the respective RFID tag. The logic controller 310 may additionally determine a WOT during which a given RFID tag's communication device (e.g., transceiver) or operation(s) is(are) to be turned on when motion is detected thereby, and communicate the same to the given RFID tag 200. The WOT can be determined based on environmental conditions (e.g., temperature, time of day, etc.) and/or system conditions (e.g., amount of traffic, interference occurrences, etc.). Other operations performed by the logic controller 310 will be apparent from the following discussion.

Notably, memory 304 may be a volatile memory and/or a non-volatile memory. For example, the memory 304 can include, but is not limited to, a RAM, a DRAM, an SRAM, a ROM, and a flash memory. The memory 304 may also comprise unsecure memory and/or secure memory. The phrase "unsecure memory," as used herein, refers to memory configured to store data in a plain text form. The phrase "secure memory," as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate determinations as to whether or not RFID tags 200 are present within a facility 128, where the RFID tags 200 are located within a facility 128, which RFID tags 200 are in motion at any given time. Other functions of the RF enabled device 350 will become apparent as the discussion progresses.

Figure 4:
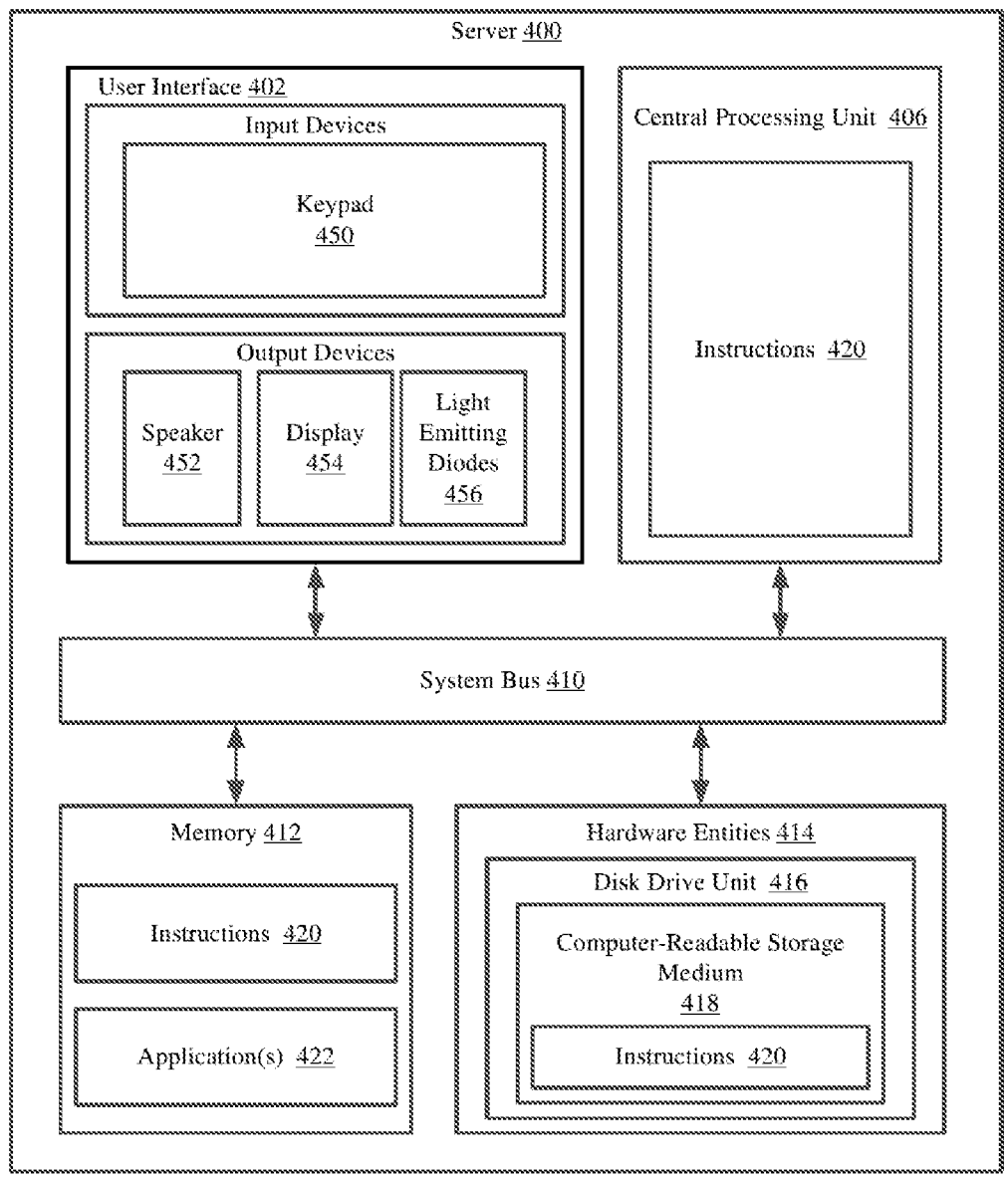
FIG. 4 is an illustration of an illustrative architecture for a server.

Referring now to FIG. 4, there is provided a detailed block diagram of an exemplary architecture for a server 400. Server 124 of FIG. 1 is the same as or substantially similar to server 400. As such, the following discussion of server 400 is sufficient for understanding server 124.

Notably, the server 400 may include more or less components than those shown in FIG. 4. However, the components shown are sufficient to disclose an illustrative embodiment implementing the present solution. The hardware architecture of FIG. 4 represents one embodiment of a representative server configured to facilitate inventory counts, inventory management, and improved customer experiences.

Some or all the components of the server 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to, and/or programmed to perform one or more of the methodologies, procedures, or functions described herein.

As shown in FIG. 4, the server 400 comprises a user interface 402, a CPU 406, a system bus 410, a memory 412 connected to and accessible by other portions of server 400 through system bus 410, and hardware entities 414 connected to system bus 410. The user interface can include input devices (e.g., a keypad 450) and output devices (e.g., speaker 452, a display 454, and/or light emitting diodes 456), which facilitate user-software interactions for controlling operations of the server 400.

At least some of the hardware entities 414 perform actions involving access to and use of memory 412, which can be a RAM, a disk driver, and/or a Compact Disc Read Only Memory ("CD-ROM"). Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, with-in the memory 412 and/or within the CPU 406 during execution thereof by the server 400. The memory 412 and the CPU 406 also can constitute machine-readable media. The term "machine-readable media," as used here, refers to a single medium or multiple media (e.g., a centralized or distributed database, and/or associated caches and servers) that store the one or more sets of instructions 420. The term "machine-readable media," as used here, also refers to any medium that is capable of storing, encoding, or carrying a set of instructions 420 for execution by the server 400 and that cause the server 400 to perform any one or more of the methodologies of the present disclosure.

In some scenarios, the hardware entities 414 include an electronic circuit (e.g., a processor) programmed for facilitating the provision of a three-dimensional map showing locations of RFID tags 200 within a facility and/or changes to said locations in near real-time. In this regard, it should be understood that the electronic circuit can access and run a software application 422 installed on the server 400. The software application 422 is generally operative to facilitate the determination of RFID tag 200 locations within a facility, the direction of travel of RFID tags 200 in motion, and the mapping of the RFID tag 200 locations and movements in a virtual three-dimensional space.

In those or other scenarios, the hardware entities 414 include an electronic circuit (e.g., a processor) programmed for facilitating item/article inventorying, merchandise sale, and/or customer satisfaction with a shopping experience. In this regard, the electronic circuit can access and run an inventorying software application 422 and an MCD display software application 422 installed on the server 400. The software applications 422 are collectively generally operative to: obtain item level information and/or other information from MCDs and RFID tags 200; program item level information, accessory information, related product information and/or discount information onto RFID tags 200 and/or MCDs; convert the language, pricing and/or currency symbol of item level information, accessory information, related product information and/or discount information; facilitate registration of RFID tags 200 and MCDs with an enterprise system; and/or determine when MCD display update actions need to be taken based on RFID tag 200 information. Other functions of the software applications 422 will become apparent as the discussion progresses. Such other functions can relate to tag reader control and/or tag control.

Figure 5:
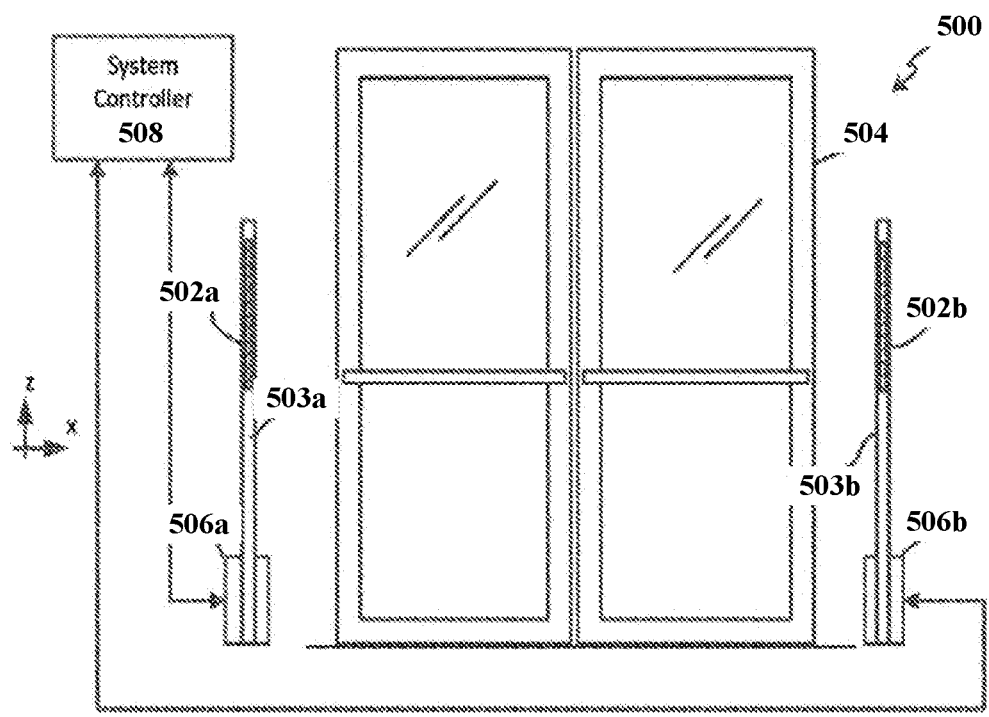
FIG. 5 is a plan view of an EAS portal at a choke point.
Figure 6:
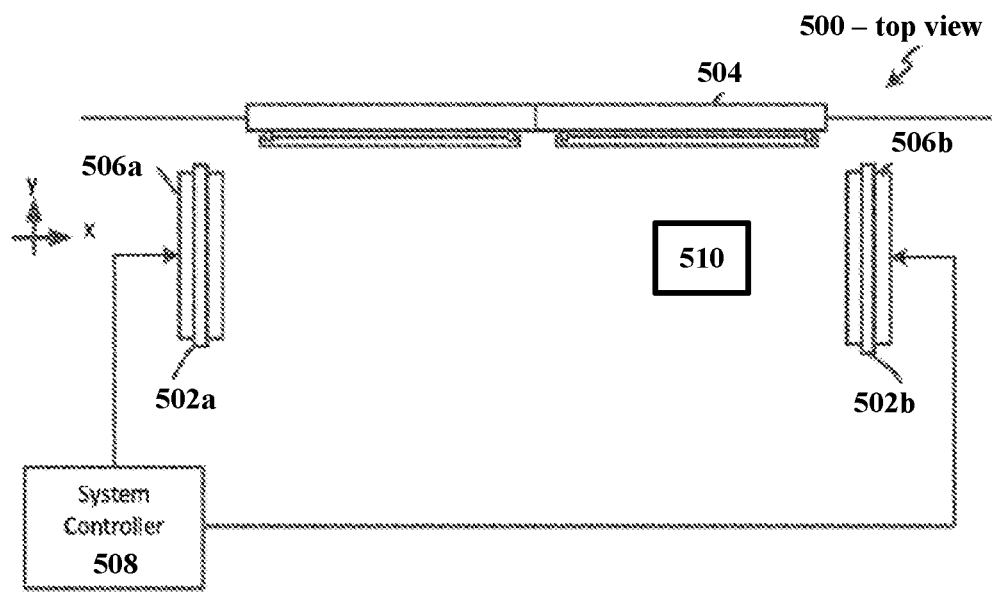
FIG. 6 is a top view of the EAS portal in FIG. 5.
Figure 7:
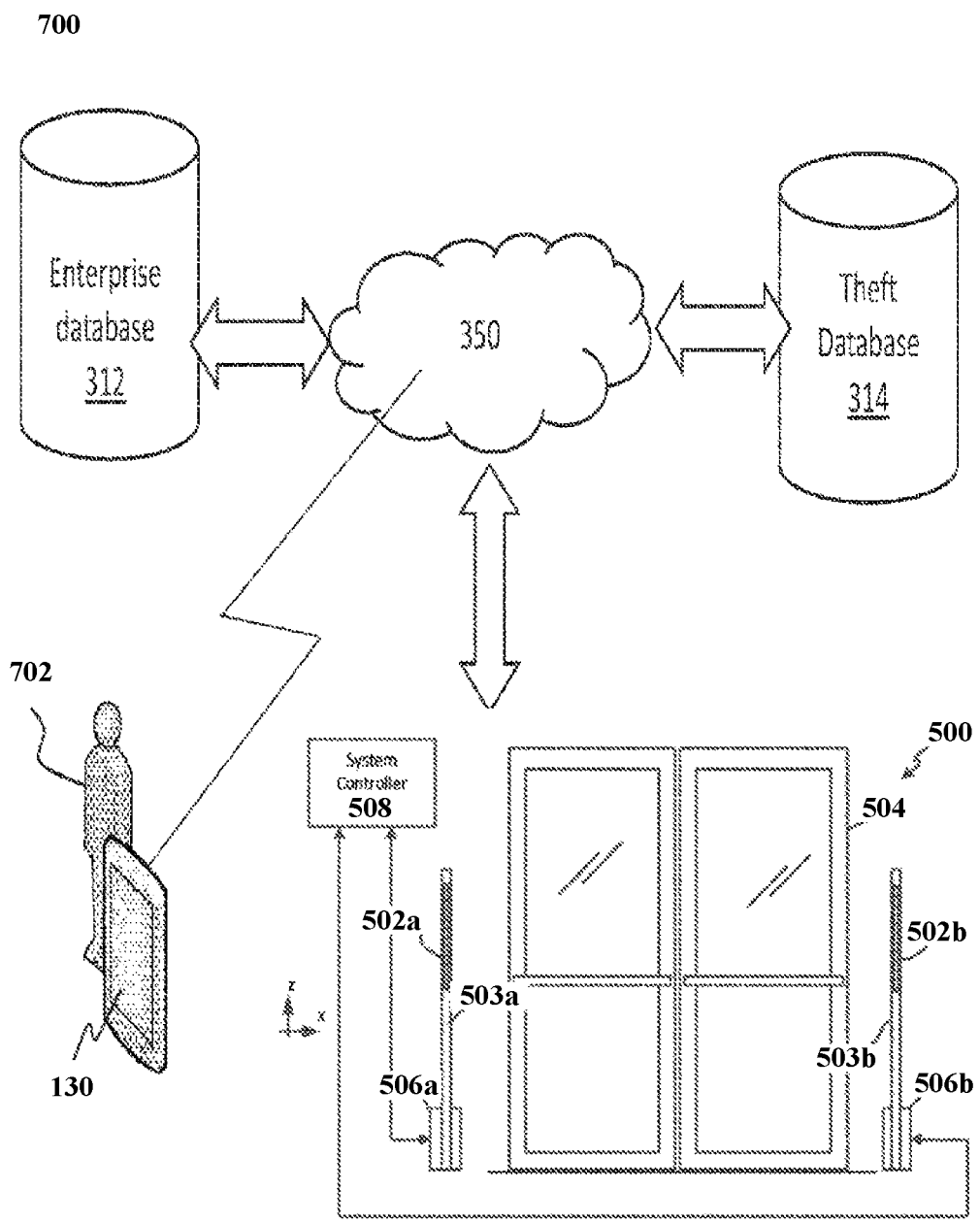
FIG. 7 is a representation of an illustrative architecture surrounding an EAS portal.

In FIGS. 5-7 there is shown an RFID portal 500 (plan view in FIG. 5, top view in FIG. 6), which is useful for understanding certain aspects of the technology disclosed herein. The RFID portal 500 includes two RFID readers 506a, 506b (such as tag reader 300, hereinafter "506," generally); each of them are respectively attached to antennas 502a, 502b (such as antenna 302, hereinafter "502," generally) mounted on sides of the portal 500. An RFID reader 506 as referenced herein is capable of generating RFID tag exciter signals to control and elicit responses from one or more of a plurality of RFID tags 510 (such as tag 200) in a RFID portal zone. The RFID exciter signals can also serve as a source of power for energizing the RFID tags 510. The exciter signals generated by the RFID readers 506 and responses received by each reader 506 will be in accordance with an RFID system standard that is now known or known in the future. The RFID readers 506 also can detect, identify, and/or process one or more the responses from the plurality of RFID tags 510 in a portal zone. The RFID readers 506 include suitable interface circuitry to facilitate communications with a system controller 508 (such as server 400) as described below. For example, the interface circuitry can facilitate communication of information regarding detected responses received from RFID tags 510. Such interface circuitry can also facilitate reception of interrogation commands and/or antenna beam control commands from the system controller 508.

In the portal 500 shown, the antennas 502 are mounted on pedestals 503a, 503b (hereinafter "503," generally), but the technology disclosed herein is not limited in this regard. Antennas 502 can be mounted in the ceiling or in the ground, and the method described herein would still be applicable. There is no restriction regarding the type of antennas 502 that are used to produce the required field patterns. However, in this example portal 500, antennas 502 are understood to be beam steerable so that multiple different antenna beam directions can be obtained from a single antenna 502. Control over the required antenna field patterns can be facilitated by the RFID readers 506 as noted above. In addition, two antennas, 502a and 502b, are shown in FIG. 5, but it should be understood that the technology disclosed herein is not limited in this regard. The inventive arrangements descried herein could be implemented using a single beam steerable antenna.

The RFID portal 500 can be placed in the vicinity of an exit point in a facility where articles 110 must pass through in order to transition from one space inside the facility 128 to a second space, which is outside of the facility 128. In the example shown in FIG. 5 and FIG. 6, the exit point is a doorway 504, but the technology disclosed herein is not limited in this regard. The exit/choke point can also be a wide exit such as those seen in shopping malls, which is open to another interior space, which is not a part of the facility 128. The RFID readers 506 can be operated under the command of a system controller 508, such as server 124, which facilitates the detection of one or more RFID tags 510 within a field of view of each antenna 502 as hereinafter described.

In the arrangement shown in FIG. 5 and FIG. 6, a human guard or monitor will likely be stationed near the RFID portal 500 to observe and interact with shoppers exiting the retail store 128. Referring now to FIG. 7, a representation 700 of a human guard or monitor 702 (hereinafter "guard 702") is shown in proximity of the RFID portal 500. The guard 702 has one or more personal communication devices on their person, such as the device 130. The device 130 enables one or more networked systems such as the network 144 to communicate with the guard 702 via the device 130. Near-real time communications that may be relevant to the detection of unauthorized RFID tags 510 by the system 500 are sent to the device 130. "Unauthorized RFID tags" are detected tags 510 where the tag data does not confirm that the article to which the tag 510 was attached was purchased prior to reaching the RFID portal 500. In some examples, when an unauthorized RFID tag 510 is detected, an alarm event flag is set. If the alarm event flag is validated, a human-perceptible alarm is triggered. If the alarm event flag is not validated, it is assumed to be a false alarm, and the alarm event flag is cleared.

In some examples, the device 130 carried by the guard 702 is enabled for bidirectional voice-data communication, and includes a display, memory, and a processor. The device 130 can be a smart phone having an application running thereon, or otherwise it can a dedicated proprietary device 130. The device 130 can display additional information useful to the guard 702 relating to the detected tag 510 to enable the guard 702 to make accurate decisions quickly as to whether to detain people based on suspected theft of an article 110.

In some examples, additional related data can be collected by measuring the reflected energy, e.g., using a received signal strength indicator (RSSI) or a received channel power indicator (RCPI), from a detected RFID tag 510. The RSSI can then be used as an estimate of the distance of the tag 510 from the interrogating antenna 502. Based on testing and experimentation, a typical RF power at the antenna is 1 W conducted and 3-6 dB of antenna gain. This is considered to be a very large signal strength. Therefore, the reflected energy (RSSI) from a RFID tag is also very large. For most tags 510 and systems running at high power, the reflected energy will be −50 dBm to −0 dBm.

The transmitted signal strength typically drops off by 24-34 dB in the first meter of separation from the antenna 502. Thereafter, the signal strength typically falls off 6 dB for every doubling of the distance away from the antenna 502. At two meters away, the signal strength is down 6 dB, at four meters away it is down 12 dB, at eight meters away it is down 18 dB, etc. Therefore, if a person is within 1-2 feet of the face of the antenna 502 and proceeds to move a detectable tag 510 back and forth, then the RSSI value for the tag read should exceed any possible RSSI for a tag 510 greater than 4 feet away. These numbers are for illustration purposed only, and in practice, it may be necessary to adjust the values based on the frequency of the specific portal 500. The rules and regulations for RFID transmissions vary by country and jurisdiction, resulting in the use of different frequencies and transmission strengths in different RFID portals 500. The values also may be adjusted depending on the type and manufacturer of the RFID tags 510 on the products/garments.

One problem encountered at times with RFID portal 500 alarm detection is that the customers do not typically walk within one foot if the RFID antennas 502. Also, in many RFID portals, a more complex algorithm can be used that reads into and out of the store 128 by beam steering the RFID read signals into and out of the store 128. Such a system is described in U.S. Pat. No. 9,519,811 entitled "SYSTEM AND METHOD FOR READING RFID TAGS ACROSS A PORTAL," which is commonly owned with the present application (hereinafter "the '811 patent"). The contents of the '811 patent are hereby incorporated herein.

As described in the '811 patent, RFID tag 510 interrogation can involve interrogating tags 510 using the dual-target mode in one of the latched sessions S1, S2 or S3. In the dual-target mode, each of the tags 510 will be read continuously regardless of whether the tag is in state "A" or state "B." The expectation in such scenarios is to be able to read all tags 510 within the field of view (FOV) of the reader antenna 502, regardless of the inventoried flag state. Typically, the power level of the RFID electromagnetic exciter field is manually tuned to limit the reading of static tags that might be far from the RFID reader 506. But as more time is spent by an RFID reader 506 to inventory the tags in the FOV of its steerable antenna 602, the opportunities increase to miss a tag 510 that is crossing in an area that is not then covered by the antenna beam. This problem can become particularly noteworthy when many tags 510 are present. It also detracts from the ability of the portal 500 to focus attention on the tags 510 that are actually crossing through the portal (as opposed to static tags 510 which are not in motion).

The system described in the '811 patent includes executing a combination of RFID tag reads using different sessions, power levels, and beam directions so as to improve RFID portal 500 accuracy in a dense tag population. The combination of read cycles allows an RFID portal 500 to detect the surrounding tags 510 and focus on the crossings tags 510. But because there potentially are a lot of tags 510 that can be read inside the store 128, the detection algorithms use session information and RSSI change information that requires multiple reads over time. As a result, if the guard 702 at the RFID portal 500 walks the bag with potentially stolen articles 110 back through the RFID portal 500, then tags 510 therein have a very low probability of alarming again.

A problem that is prevalent in the industry is that store personnel, especially human exit guards such as guard 702, expect the RFID portal 500 alarm to work in the same way as acousto-magnetic (AM) EAS systems that they may have become accustomed to working with.

Examples of the technology disclosed herein include offering some alarm detection logic similar to that of an AM EAS system. In some examples, the RFID portal 500 alarms when an RFID tag 510 (still attached to the article) is placed within a short distance (e.g., under 18") the RFID portal 500 antennas 502. While this approach differs slightly from the operation of an AM system (because the range of where the tags 510 would need to be placed would be much smaller: e.g., 1-2 feet, as opposed to 3-7 feet for the AM system), the example methods is useful for determining probable theft after an initial alarm event flag is set, and would help solve some of the problems set forth above.

In addition, consider that RFID tags 510 on the articles 110 each have a serial number and are unique to the article 110 that they are attached to. Therefore, an Electronic Product Code (EPC) or Stock Keeping Unit (SKU) number can be sent in real-time to am MCM 130 (such as a mobile device, tablet, handheld RFID reader), or to a smart screen (e.g., on or near the RFID portal 500). Then system can then query datastore 126 to obtain data describing the article 110 associated with the detected tag 510. The retrieved data can include a description of the article 110, e.g., including, size, color, ID numbers, and price, along with an image file of the article 110 associated with the alarming tag 510 that can be displayed to the guard 702, e.g., on MCM 130.

The image of the article 110 and associated description may assist the guard 702 in validating the alarm event flag at the RFID portal 500. The guard 702 may be able to quickly inspect the inside the customer's bag to visually determine if the article in question is inside the bag. In some examples of the technology disclosed herein, the system 100 retrieves data from one or more back end retail theft databases to provide still more information that the guard could use to determine if a theft is occurring. Such approaches can support the guard's 702 decision in at least two ways: (a) information acquired by the exit system logic, this is probability of this event being a theft as determined by the exit system and (b) such event combined with a backend system where a datastore can provide relevant data pertaining to theft.

In some examples, the data providing enriched information to the guard 702 can include: the frequency that the type of article 110 is stolen from all stores (e.g., store item stolen ranking), the frequency that such an article 110 is stolen from that particular store (e.g., store neighborhood stole item ranking), customer information to help determine if this is a known good customer or a previous theft customer, historical information on how often such articles 110 are being stolen and during what time of day, the total count of articles 110 being stolen, and other relevant information.

The customer information can be obtained using any number of well-known methods. Cameras can be used to capture facial image data of the suspected thief, and the system can use facial recognition algorithms to compare this image with images in a database of known shoplifters. The customer's identity may be tracked from the point of sale (POS) where the customer used a credit or debit card, or a loyalty card associated with the customer. The identified customer can then be tracked to the point of exit using any suitable human tracking system. The customer can also be identified by responses from their mobile devices, and loyalty cards they may be carrying. For example, the customer may be logged into the store's Wi-Fi, or may be using running the store's application on their phone. It is not necessary to obtain the real legal identity of the customer. The identity data sensed from the customer and/or their phone can be compared on an anonymous basis with similar data in a known thief database.

A theft probability algorithm can assign weights to the various data parameters retrieved from a theft database. Some examples of the technology disclosed herein can use the theft probability algorithm to determine a percentage representing an estimated overall probability of theft relating to the alarm event flag. This probability of theft can be based at least in part on analysis of local data collected at the scene, in combination with historical and statistical data retrieved from the theft database.

The calculated probability of theft, represented as a percentage, can be transmitted to the guard via the MCD 130 and displayed thereon. In some examples, the retrieved data from the theft database can be displayed on the MCD 130 in a raw format, so that the guard 702 can view the actual data and make their own determination as to the probability that theft is occurring. In practice, both the calculated probability percentage and the raw data results can be simultaneously displayed on an MCD 130.

In some examples of the technology disclosed herein, the calculated probability of theft can be used to provide an explicit directive to the guard 702 or additional employees that the person attempting to exit the premises should be stopped and questioned about their purchases and articles they may be carrying. This can be accomplished by setting a threshold on the calculated probability of theft where the interception of the customer is required. Other parameters can be used to instead of, or in addition to, the calculated probability of theft, to determine when a customer should definitely be stopped before exiting. For example, if the customer is identified as a known, habitual thief, this factor alone can trigger a directive to stop the customer if the customer is associated with an alarm event flag. The exact parameters to be used in a determination of when a customer should be stopped can be selected by the retailer.

Sending explicit notifications to one or more employees directing them that a customer is to be intercepted before exiting can provide many advantages. The technology reduces the need for subjective "on the spot" decisions by employees which may take too much time. The technology helps guards and other employees to more effectively do their jobs because they do not have to second-guess their own decision to stop a customer. A system-generated directive to stop the customer also saves time, because the window in which a customer can be stopped, between the time they set off the alarm to the time they exit the store, can be very short.

In accordance with some examples of the technology disclosed herein, the guard 702 receives, through device 130, a system-generated message that they are to stop a particular customer. The system-generated "stop customer" message can be sent to multiple employees are once who may be in proximity of the exits. The notification message to stop the customer necessarily includes sufficient information on the customer to allow the guard to identify, quickly and accurately, the customer to be stopped. The information conveyed to the guard can include the display of real-time motion map showing representations of people and objects moving toward the exits, where the representation of the person to be stopped is highlighted. Other methods include sending a visual image of the person to the guard's mobile device, where the image was taken at the moment the RFID portal 500 alarmed. In one embodiment, the image can be taken by a camera mounted on the RFID portal 500.

The guard 703 can also be equipped with a reader 300 that enables the guard 702 to scan a customer's receipt (e.g. using a barcode, QR, OCR etc.) to determine what articles 110 are in the customer's possession compared with those articles 110 processed at POS, and in comparison with the RFID "license plate," which is the tag data detected by the RFID portal 500.

The guard 702 could use the additional information communicated to their device 130 to facilitate and improve upon their decisions. For example, if the alarm is on an article 110 that is near the RFID portal 500 and the guard 702 did not see the customer walk near the RFID portal 500, then the guard 702 can, at their discretion, ignore this alarm event flag. If the RFID portal 500 has a camera and it can determine that the person leaving is known to have stolen before, then the guard 702 can stop that person and check their bags. If the guard 702 has a handheld RFID reader 300, then this information can be sent to that device so that the guard can scan the customers to find the specific RFID tags 510 that are being indicated as stolen.

In an example system 100, the RSSI is set to a threshold of 68. This corresponds to a read range of 6 inches at 22 dBm power with a 4-6 dB gain antenna, 9-12 inches at 25 dBm and 12-18 inches at 30 dBm. These values are approximate and depend on the power settings. In a variation, the power is set to 30 dBm on all of the antennas. It is believed that this setting will raise the RSSI threshold to make it harder to trigger an alarm, thus reducing the occurrences of false alarms.

To reduce the risk of multiple signals bouncing constructively into the store 128 and giving a high power to a tag 200 that is sitting inside the store, in some examples of the technology disclosed herein, a minimum number of high RSSI reads is required before an alarm event flag is triggered. In practice, minimum number of high RSSI read could be set to 1, but in some cases, it should be set to 2 or 3 read events exceeding the threshold within a few seconds.

In some examples of the technology disclosed herein, the alarm event logic can also be gated by only triggering an alarm if one of the people counter/motion sensor detectors is triggered. In some examples, where an overhead people counter is the data source, an alarm is only triggered when a person is standing near the exit gate for a minimum time after the detection of an unauthorized tag. In some examples, the alarm logic is based on detecting motion near the pedestal and then determining that a person is within reach of a pedestal, and concurrently getting one or more high-RSSI reads. In some examples of the technology disclosed herein, if all three of the above criteria are met after an unauthorized tag 200 is detected, a rule is applied that the alarm is automatically triggered.

In the practice of examples of the technology, the value of the parameters to be set are selected based on the individual system, and the location of that system, so that the technology can be implemented for all of the different types of RFID tags 200, articles 110, tagging methods, regulatory regions, and use cases. For example, in the US there are 50 frequencies used for RFID protocols, and each one will have a slightly different optimal value. In these cases, logic can be added to change the threshold for each transmission frequency.

Figure 8:
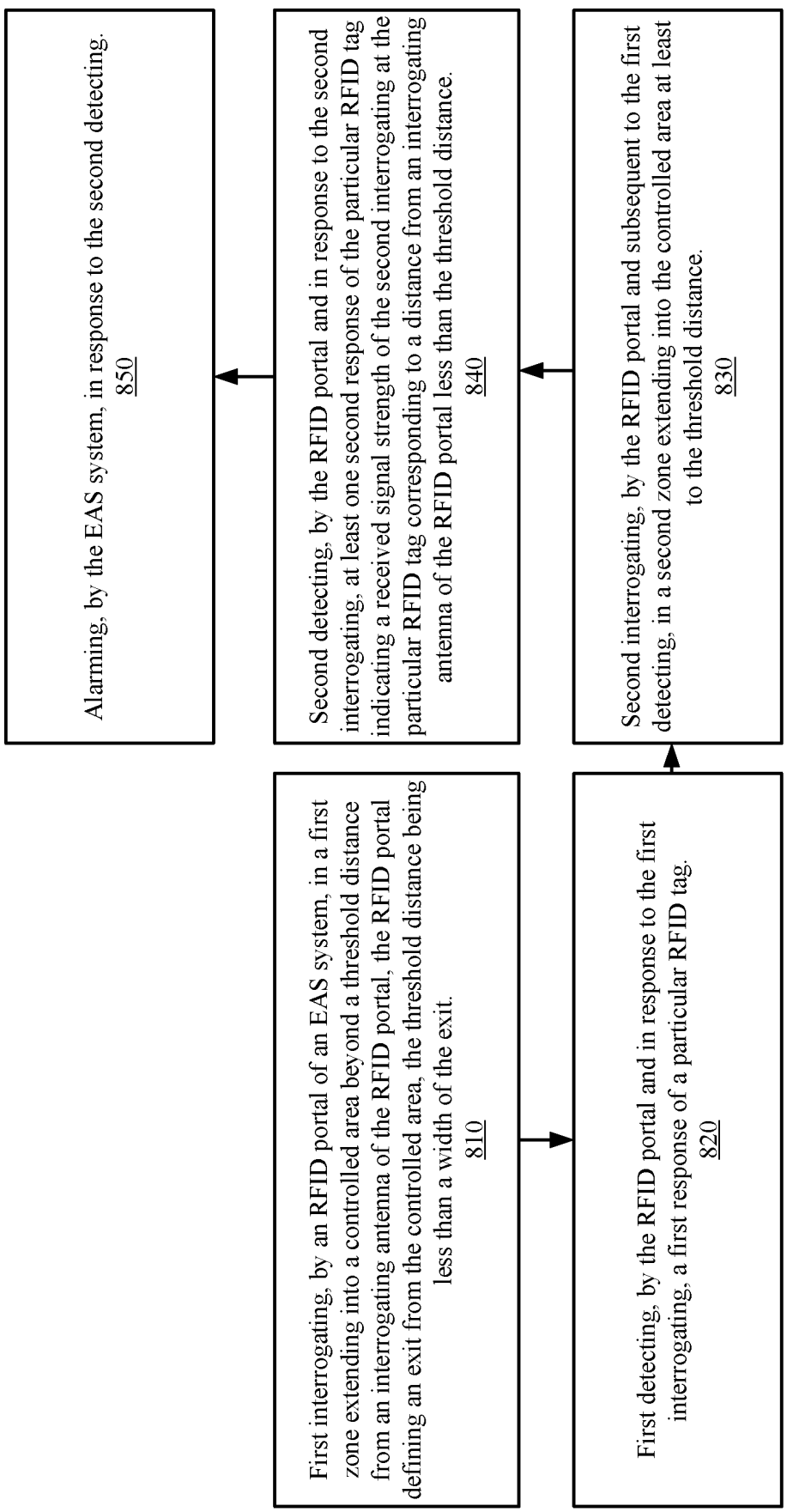
FIG. 8 is a flow chart flow chart of a method of electronic article surveillance, in accordance with examples of the technology disclosed herein.

Referring to FIG. 8, and continuing to refer to prior figures for context, methods 800 for electronic article surveillance (EAS) are shown. In such methods 800, an RFID portal of an EAS system first interrogates in a first zone extending into a controlled area beyond a threshold distance from an interrogating antenna of the RFID portal—Block 810. In such methods, the RFID portal defines an exit from the controlled area, the threshold distance being less than a width of the exit.

Consider, as a continuing example, a customer purchasing two articles 110 (tagged with tag X 112) and article 116 (tagged with tag Y 118) at a POS in store 128. The POS updates datastore 126 with the "purchased" status of article 116, authorizing the article 116 to leave the store 128, but fails to update the purchase status of article 110, which remains unauthorized to leave the store.

In the continuing example, RFID portal 500 interrogates in a first zone extending into the store 128 by executing a combination of RFID tag reads around using different sessions, power levels, and beam directions, e.g., per the '811 patent. In the continuing example, the first interrogation zone at times extends outside the store 128. The combination of read cycles allows an RFID portal 500 to detect the surrounding tags 510 and focus on the tags 510 crossing/about to cross through the RFID portal 500. But because there potentially are a lot of tags 510 that can be read inside the store 128, the detection algorithms use session information and RSSI change information that requires multiple reads over time. As a result, if the guard 702 at the RFID portal 500 walks a bag with potentially stolen articles 110 (tags 510 attached) back through the RFID portal 500, then tags 510 therein have a very low probability of alarming again, i.e., a given tag 510 may not be guaranteed to respond to a subsequent interrogation during the multisession interrogation period. Yet, re-interrogating a bag or article is an expected practice of a guard 702. In the continuing example, the threshold distance is about 1 ft. (corresponding to an expected drop off of about 10 dB in received power at a tag 510), the power level of the first interrogation is 1 W (conducted), and with 4 dB of antenna gain in each of two beam steered antennas 502.

Figure 9:
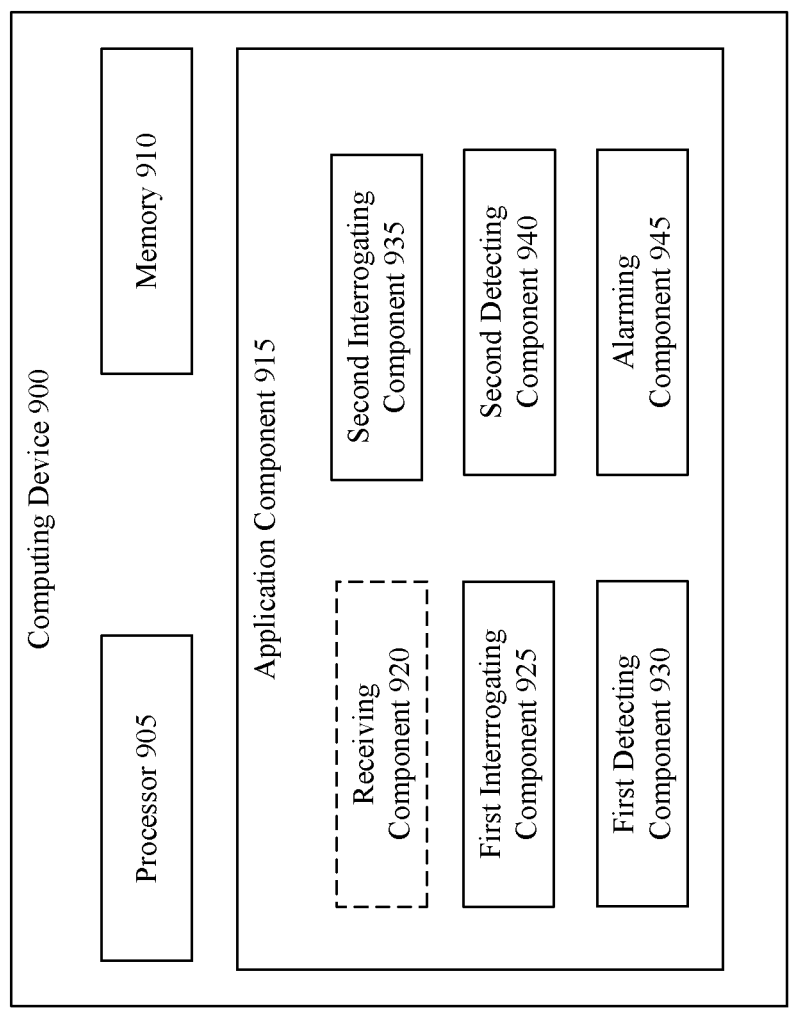
FIG. 9 is an illustration of a computing device including components for performing the function of examples of the technology disclosed herein.

Referring to FIG. 9, in operation, EAS system 100 may perform the method 800 of electronic article surveillance, by such as via execution of application component 915 by processor 905 and/or memory 910—wherein application component 915, processor 905, and/or memory 910 are components of computing device 900. Computing device 900 can be one or more of a tag 510, a tag reader 506, and system controller 508—as appropriate as explained elsewhere herein. In a separate example, application component 915 includes first interrogating component 925 that is configured to or may comprise means for first interrogating in a first zone extending into a controlled area beyond a threshold distance from an interrogating antenna of the RFID portal.

The RFID portal 500 first detects, in response to the first interrogating, a first response of a particular RFID tag—Block 820. In the continuing example, RFID portal 500 detects Tag X 112 and tag Y 118 (about 5 ft. away from one of the antennas 602, inside the store 128), and further determines that tag X 112 is moving in the direction of the exit/RFID portal 500 without authorization to leave the store 128—thereby setting an alarm event flag. The EAS system notifies a guard 702 stationed near the RFID portal 500, through the guard's handheld mobile communication device 130 (a mobile phone), that an alarm event flag has been set—though the alarm is not yet sounded—and instructs the guard 702 to check for customers exiting through the RFID portal 500, and to examine articles 110, 116 carried by such customers. The guard 702 finds one customer carrying an article 110 still carrying a tag 510 and article 116 also still carrying a tag 510. In the separate example, application component 915 includes first detecting component 930 that is configured to or may comprise means for first detecting, in response to the first interrogating, a first response of a particular RFID tag.

Subsequent to the first detecting, the RFID portal second interrogates in a second zone extending into the controlled area at least to the threshold distance—Block 830. In the continuing example, the second interrogation is in response to the first detecting, and comprises interrogating in which all RFID tags 510 in the second interrogation field are allowed to respond. The same conducted power is used as in the first interrogation. In particular, the guard 702, in response to the notification described above, passes each of the customer-carried article 116 still carrying a tag 510 (also as yet unidentified by the guard 702) and then article 112 still carrying a tag 510 (as yet unidentified by the guard 702) in turn within 1 ft. of an antenna 502 in a pedestal 503 of the RFID portal 500 (inside the threshold distance in the second interrogation zone) during this second interrogation period—in a fashion similar to procedures for AM EAS systems. In the separate example, application component 915 includes second interrogating component 935 that is configured to or may comprise means for second interrogating in a second zone extending into the controlled area at least to the threshold distance.

RFID portal second detects, in response to the second interrogating, at least one second response of the particular RFID tag indicating a received signal strength of the second interrogating at the particular RFID tag corresponding to a distance from an interrogating antenna of the RFID portal less than the threshold distance—Block 840. In the continuing example, the RFID portal 500 detects tag Y 118 multiple times as the guard 702 passes article 116 with tag Y 118 attached within 1 ft. of antenna 502, but since tag Y 118 was authorized to leave the store 128, no action is taken by the EAS system 100. The RFID portal 500 then detects tag X 510 multiple times as the guard 702 waves the article 110 (to which a tag X 112 remains attached) within 1 ft. of an antenna 502 of the RFID portal 500. The detected response from tag X 112 both identifies the tag 510 as tag X 112 and includes an RSSI corresponding roughly to the expected received signal strength at a tag within 1 ft. of antenna 502. In the separate example, application component 915 includes second detecting component 940 that is configured to or may comprise means for second detecting, in response to the second interrogating, at least one second response of the particular RFID tag indicating a received signal strength of the second interrogating at the particular RFID tag corresponding to a distance from an interrogating antenna of the RFID portal less than the threshold distance.

The EAS system alarms in response to the second detecting—Block 850. In the continuing example, the detection of unauthorized tag X 112 sets of an alarm at the RFID portal 500, notifying the guard that tag X 112 has not been authorized to leave the store 128. In the continuing example, the guard 702 confirms that the POS system failed to record properly the article 110 to which tag X 112 was attached as "purchased." In the separate example, application component 915 includes alarming component 945 that is configured to or may comprise means for alarms in response to the second detecting.

In some examples, after RFID tag detection is initiated, the EAS system 100 determines whether a given tag is authorized for removal. If the given tag is not authorized for removal, the EAS system 100 sets an alarm event flag and transmits an alarm even flag alert to a mobile device 130 of an employee on scene in a store 128 to monitor an RFID portal 500. The EAS system 100 estimates the location of the given tag based on RSSI. If the given tag's estimated location is within a threshold distance, e.g., 18 in., of an antenna 502 of the RFID portal 500, then the EAS system 100 triggers an alarm, transmitting an alarm to the mobile device 130 of the employee. If the given tag's estimated location is not within a threshold distance, e.g., 18 in., of an antenna 502 of the RFID portal 500, then the EAS system 100 collects theft probability data related to the alarm event.

The collected theft probability data can be sent to the employee through the mobile device 130 and sent for analysis on the EAS system 100 server. On the server, the EAS system 100 can use real-time people counter/motion sensor data to determine if a person was detected in the RFID portal 500. If no person was detected, the EAS system 100 cancels the alarm flag. If a person was detected, then the EAS system determines if the person was moving. If the detected person was not moving, then the EAS system 100 cancels the alarm flag. If the detected person was found to be moving, then the EAS system triggers an alarm and transmits an alarm confirmation alert to the mobile device 130 of the employee at the RFID portal 500.

In addition, the collected theft probability data can be combined with RFID portal 500 and POS sensors to capture customer-identifying data, which can then be used to query a known thief database 314 for possible matched. If a match is located, then the EAS system 100 triggers an alarm and transmits an alarm confirmation alert to the mobile device 130 of the employee at the RFID portal 500. Further, collected theft probability data can be used to query an enterprise database for product info corresponding to the detected RFID tag. The retrieved product info can be transmitted to the mobile device 130 of the employee at the RFID portal 500, displaying an image of the alerted item along with a product description. Further yet, the collected theft probability data can be used to query the theft database 314 for historical theft data relevant to the article, store location, time and date parameters and customer-identifying information. The retrieved information can be transmitted to the mobile device 130 of the employee at the RFID portal 500 along with a calculated percentage probability that a theft is occurring.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of electronic article surveillance (EAS), comprising:
   first interrogating, by an RFID portal of an EAS system, into a controlled area;
   first detecting, by the RFID portal and in response to the first interrogating, a first response of a particular RFID tag indicating an alarm event;
   second interrogating, by the RFID portal and subsequent to the first detecting, into the controlled area;
   second detecting, by the RFID portal and in response to the second interrogating, at least one second response of the particular RFID tag indicating a received signal strength of the second interrogating at the particular RFID tag corresponding to a distance from an interrogating antenna of the RFID portal less than a threshold distance; and
   alarming, by the EAS system, in response to the alarm event and the second detecting.

2. The method of claim 1, wherein:
   first detecting comprises determining, by the EAS system, that the particular tag is moving in a direction exiting the controlled area, and
   the second interrogating is in response to the first detecting.

3. The method of claim 1, wherein alarming comprises displaying information relating to at least one of: the particular RFID tag, and an article associated with the particular RFID tag.

4. The method of claim 3, displaying comprises displaying on one of the RFID portal or a mobile communication device.

5. The method of claim 1, wherein indicating a received signal strength comprises responding with a received signal strength indicator (RSSI).

6. The method of claim 1, wherein the threshold distance is no greater than one foot.

7. The method of claim 1, wherein the threshold distance is no greater than two feet.

8. The method of claim 1, further comprising, receiving, by the EAS system prior to the first interrogating, selection of the threshold distance.

9. The method of claim 1, wherein:
   the first interrogating comprises multi-session interrogating during which the particular RFID tag would not be guaranteed to respond to a subsequent interrogation; and
   the second interrogating comprises interrogating in which all RFID tags within the threshold distance are allowed to respond.

10. The method of claim 1, wherein the second detecting comprises at least a predetermined threshold number, greater than one, of second responses.

11. The method of claim 1, wherein the alarming further requires an indication of at least one person in the portal concurrent with the first detecting.

12. A electronic article surveillance (EAS) system, comprising:
   a radio frequency identification (RFID) portal operative to:
     first interrogate into a controlled area;
     first detect, in response to the first interrogating, a first response of a particular RFID tag indicating an alarm event;
     second interrogate, in response to the first interrogating, a first response of a particular RFID tag indicating an alarm event;
     second detect, in response to the second interrogating, at least one second response of the particular RFID tag indicating a received signal strength of the second interrogating at the particular RFID tag corresponding to a distance from an interrogating antenna of the RFID portal less than a threshold distance; and
     alarm, by the EAS system, in response to the alarm event and the second detecting.

13. The system of claim 12, wherein:
   first detecting comprises determining, by the EAS system, that the particular tag is moving in a direction exiting the controlled area, and
   the second interrogating is in response to the first detecting.

14. The system of claim 12, wherein alarming comprises displaying information relating to at least one of: the particular RFID tag, and an article associated with the particular RFID tag.

15. The system of claim 14, displaying comprises displaying on one of the RFID portal or a mobile communication device.

16. The system of claim 12, wherein indicating a received signal strength comprises responding with a received signal strength indicator (RSSI).

17. The system of claim 12, wherein the threshold distance is no greater than one foot.

18. The system of claim 12, wherein the threshold distance is no greater than two feet.

19. The system of claim 12, wherein the RFID portal is further operative to receiving, prior to the first interrogating, selection of the threshold distance.

20. An apparatus for electronic article surveillance (EAS), comprising:
   means for first interrogating, by an RFID portal of an EAS system, into a controlled area;
   means for first detecting, by the RFID portal and in response to the first interrogating, a first response of a particular RFID tag indicating an alarm event;
   means for second interrogating, by the RFID portal and in response to the first interrogating, a first response of a particular RFID tag indicating an alarm event;
   means for second detecting, by the RFID portal and in response to the second interrogating, at least one second response of the particular RFID tag indicating a received signal strength of the second interrogating at the particular RFID tag corresponding to a distance from an interrogating antenna of the RFID portal less than a threshold distance; and means for alarming, by the EAS system, in response to the alarm event and the second detecting.

* * * * *